(12) United States Patent
Cripsey et al.

(10) Patent No.: US 9,039,560 B2
(45) Date of Patent: *May 26, 2015

(54) FLOW-FORMED DIFFERENTIAL CASE ASSEMBLY

(71) Applicant: Metal Forming & Coining Corporation, Maumee, OH (US)

(72) Inventors: Timothy J. Cripsey, Rochester, MI (US); Robert J. Herston, New Baltimore, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,095

(22) Filed: Dec. 9, 2013

(65) Prior Publication Data

US 2014/0094337 A1 Apr. 3, 2014

Related U.S. Application Data

(63) Continuation of application No. 13/174,971, filed on Jul. 1, 2011, now Pat. No. 8,628,444.

(60) Provisional application No. 61/360,726, filed on Jul. 1, 2010.

(51) Int. Cl.
F16H 48/08 (2006.01)
F16H 48/38 (2012.01)
F16H 48/40 (2012.01)

(52) U.S. Cl.
CPC ............. *F16H 48/40* (2013.01); *Y10T 74/2188* (2015.01); *Y10T 74/2186* (2015.01); *F16H 2048/085* (2013.01); *F16H 2048/087* (2013.01); *F16H 48/38* (2013.01); *F16H 48/08* (2013.01); *F16H 2048/382* (2013.01)

(58) Field of Classification Search
CPC .................... F16H 2048/085; F16H 2048/087; F16H 48/08; F16H 48/38
USPC ......................................... 475/220–253, 332
See application file for complete search history.

(56) References Cited

U.S. PATENT DOCUMENTS

| | | | | |
|---|---|---|---|---|
| 1,396,225 | A | * 11/1921 | Logue et al. | ................... 475/226 |
| 5,980,416 | A | * 11/1999 | Gafvert | .......................... 475/230 |
| 6,045,479 | A | 4/2000 | Victoria et al. | |
| 6,061,907 | A | 5/2000 | Victoria et al. | |
| 6,135,911 | A | 10/2000 | Hauser | |
| 6,176,152 | B1 | 1/2001 | Victoria et al. | |
| 6,227,024 | B1 | 5/2001 | Koestermeier | |
| 6,379,277 | B1 | 4/2002 | Victoria et al. | |
| 6,434,991 | B1 | 8/2002 | Jaschka | |
| 6,652,408 | B2 | 11/2003 | Rutt et al. | |
| 6,840,883 | B2 | 1/2005 | Orr et al. | |
| 6,945,898 | B2 | 9/2005 | Szuba | |

(Continued)

*Primary Examiner* — Tisha Lewis
(74) *Attorney, Agent, or Firm* — Fraser Clemens Martin & Miller LLC; James D. Miller

(57) ABSTRACT

A differential case assembly includes a differential case and a pinless gear assembly. The differential case has an open end and a side wall with an interior surface. The pinless gear assembly includes a retainer insert and a side gear with a shaft extending outwardly therefrom. The retainer insert is disposed adjacent the interior surface of the side wall. The retainer insert defines at least a portion of an aperture that receives an end of the shaft to align the gear assembly within the differential case.

18 Claims, 13 Drawing Sheets

(56) References Cited

U.S. PATENT DOCUMENTS

| | | |
|---|---|---|
| 6,983,632 B2 | 1/2006 | Mayfield |
| 7,025,702 B2 | 4/2006 | Saito |
| 7,207,110 B2 | 4/2007 | Pascoe et al. |
| 7,261,664 B2 | 8/2007 | Szuba |
| 7,306,537 B2 | 12/2007 | Nakajima |
| 7,350,391 B2 | 4/2008 | Takagi |
| 7,367,914 B2 | 5/2008 | Rosochacki et al. |
| 7,445,088 B2 | 11/2008 | Watanabe et al. |
| 7,485,064 B2 | 2/2009 | Rosochacki et al. |
| 7,695,392 B2 | 4/2010 | Isken, II et al. |
| 7,819,040 B2 | 10/2010 | Meier et al. |
| 8,047,946 B2 * | 11/2011 | Nakajima et al. ............. 475/230 |
| 2006/0276296 A1 | 12/2006 | Rosochacki et al. |
| 2006/0278036 A1 | 12/2006 | Rosochacki et al. |
| 2008/0016670 A1 | 1/2008 | Meier |
| 2009/0013533 A1 | 1/2009 | Isken, II et al. |
| 2009/0137357 A1 | 5/2009 | Meier et al. |
| 2009/0215572 A1 | 8/2009 | Yeh |
| 2009/0266198 A1 | 10/2009 | Nosakowski |

* cited by examiner

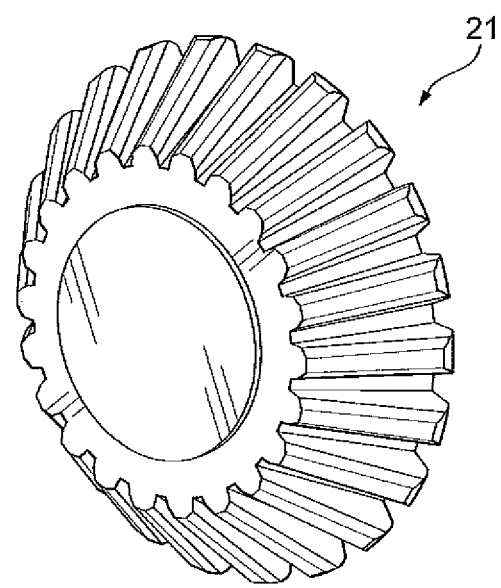
FIG.8
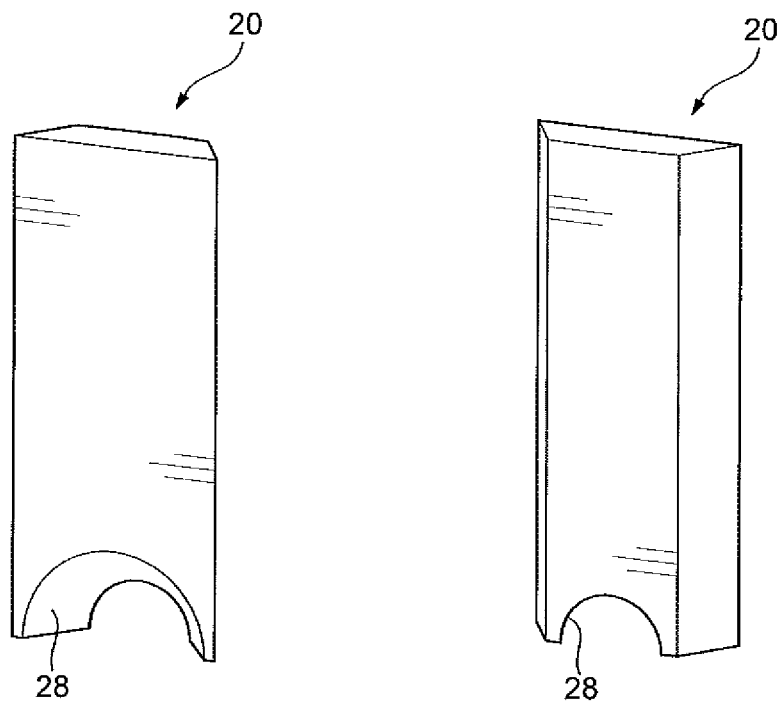
FIG.9  FIG.10

FLOW-FORMED DIFFERENTIAL CASE ASSEMBLY

CROSS-REFERENCE TO RELATED APPLICATIONS

This application is a continuation of application Ser. No. 13/174,971 filed on Jul. 1, 2011, which claims the benefit of U.S. Provisional Patent Application No. 61/360,726 filed on Jul. 1, 2010. The entire disclosures of the above applications are incorporated herein by reference.

FIELD OF THE INVENTION

The present disclosure relates to a differential case assembly and, particularly, a differential case assembly for use in a motorized vehicle.

BACKGROUND OF THE INVENTION

A differential is a device, usually employing gears, that is capable of transmitting torque and permitting rotation of different shafts at different speeds. Known differentials have cases that are cast from metals such as iron, and are often heavy and volumetrically undesirable. Assembly of known differentials can be difficult, oftentimes requiring bolting as well as welding. The use of "feed-in and rotate processes" when cast iron differential cases are manufactured is also known. Welding of the differentials formed from cast iron, in particular, can undesirably require the use of filler wire to provide an acceptable weld.

There is a continuing need for a differential case assembly that is lighter compared to known cast iron designs, minimizes a required packaging space, minimizes assembly complexity, and can be employed with different numbers of gears. A differential case assembly that facilitates welding and eliminates a need for multiple nuts/bolts in the assembly process is also desired.

SUMMARY OF THE INVENTION

In concordance with the instant disclosure, a differential case assembly that is lighter compared to known cast iron designs, minimizes a required packaging space, minimizes assembly complexity, can be employed with different numbers of gears, facilitates welding, and eliminates a need for multiple nuts/bolts in the assembly process, is surprisingly discovered.

In one embodiment, a differential case assembly includes a differential case and a pinless gear assembly. The differential case has an open end and a side wall with an interior surface. The pinless gear assembly includes a retainer insert and a side gear with an integral shaft extending outwardly therefrom. The retainer insert is disposed adjacent the interior surface of the side wall. The retainer insert defines at least a portion of an aperture that receives an end of the shaft to align the gear assembly within the differential case. The shaft may be one of frustoconical and cylindrical.

DRAWINGS

The above, as well as other advantages of the present disclosure, will become readily apparent to those skilled in the art from the following detailed description, particularly when considered in the light of the drawings described herein.

FIG. 8 is another perspective view of the side gear shown in FIG. 7;

FIG. 9 is a perspective view of a retainer insert of the differential case assembly shown in FIGS. 1-6;

FIG. 10 is another perspective view of the retainer insert shown in FIG. 9;

DETAILED DESCRIPTION OF THE INVENTION

Figure 1:
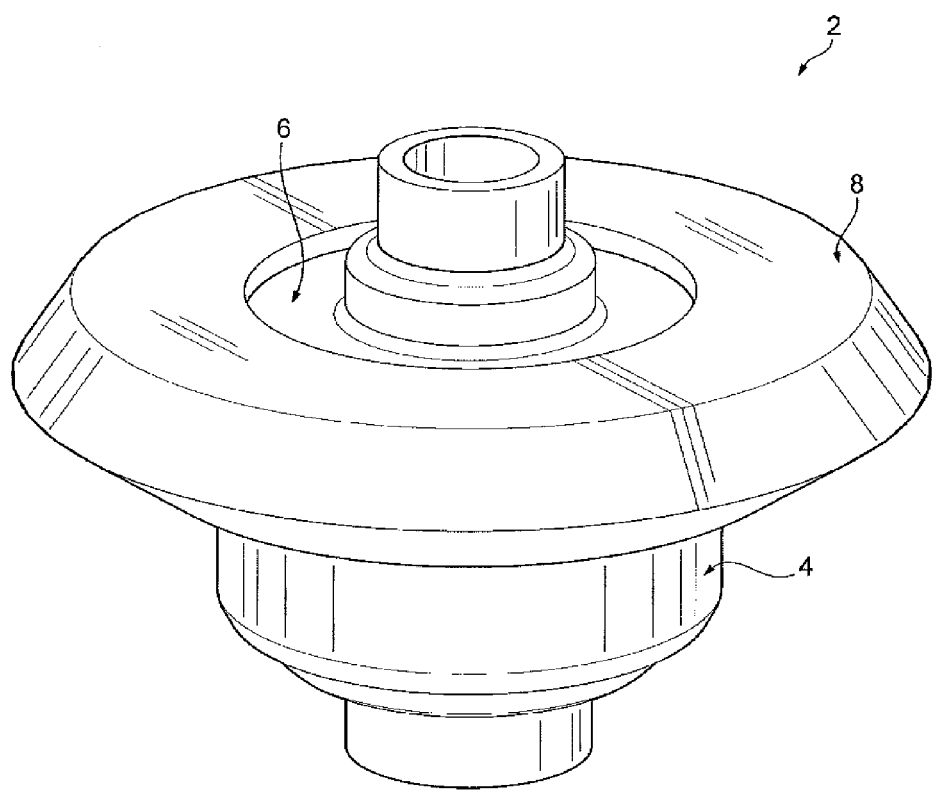
FIG. 1 is a perspective view of a differential case assembly according to an embodiment of the present disclosure.
Figure 2:
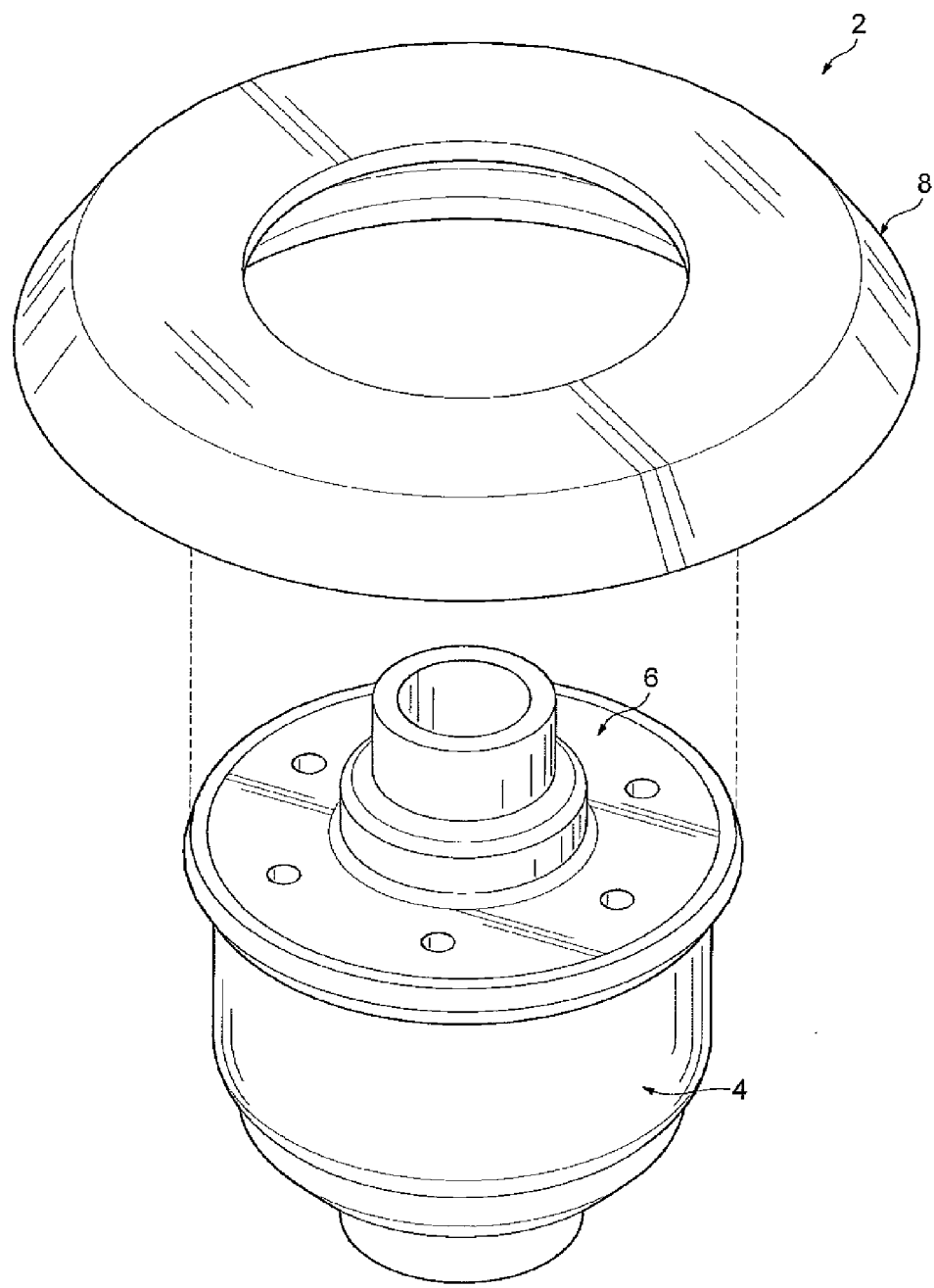
FIG. 2 is a partially exploded perspective view of the differential case assembly shown in FIG. 1.

The following description is merely exemplary in nature and is not intended to limit the present disclosure, application, or uses. It should also be understood that throughout the drawings, corresponding reference numerals indicate like or corresponding parts and features.

FIGS. 1-11 depict a differential case assembly 2 according to one embodiment of the present disclosure. With particular reference to FIGS. 1-5, the differential case assembly 2 includes a differential case 4, an end cap 6, a ring gear 8, and a pinless gear assembly 10. The differential case 4, the end cap 6, and the ring gear 8 cooperate to house the pinless gear assembly 10. It should be understood that the pinless gear assembly 10 does not have a cross pin, for example, as disclosed in Assignee's co-pending U.S. patent application Ser. No. 13/094,406, the entire disclosure of which is hereby incorporated herein by reference.

Figure 3:
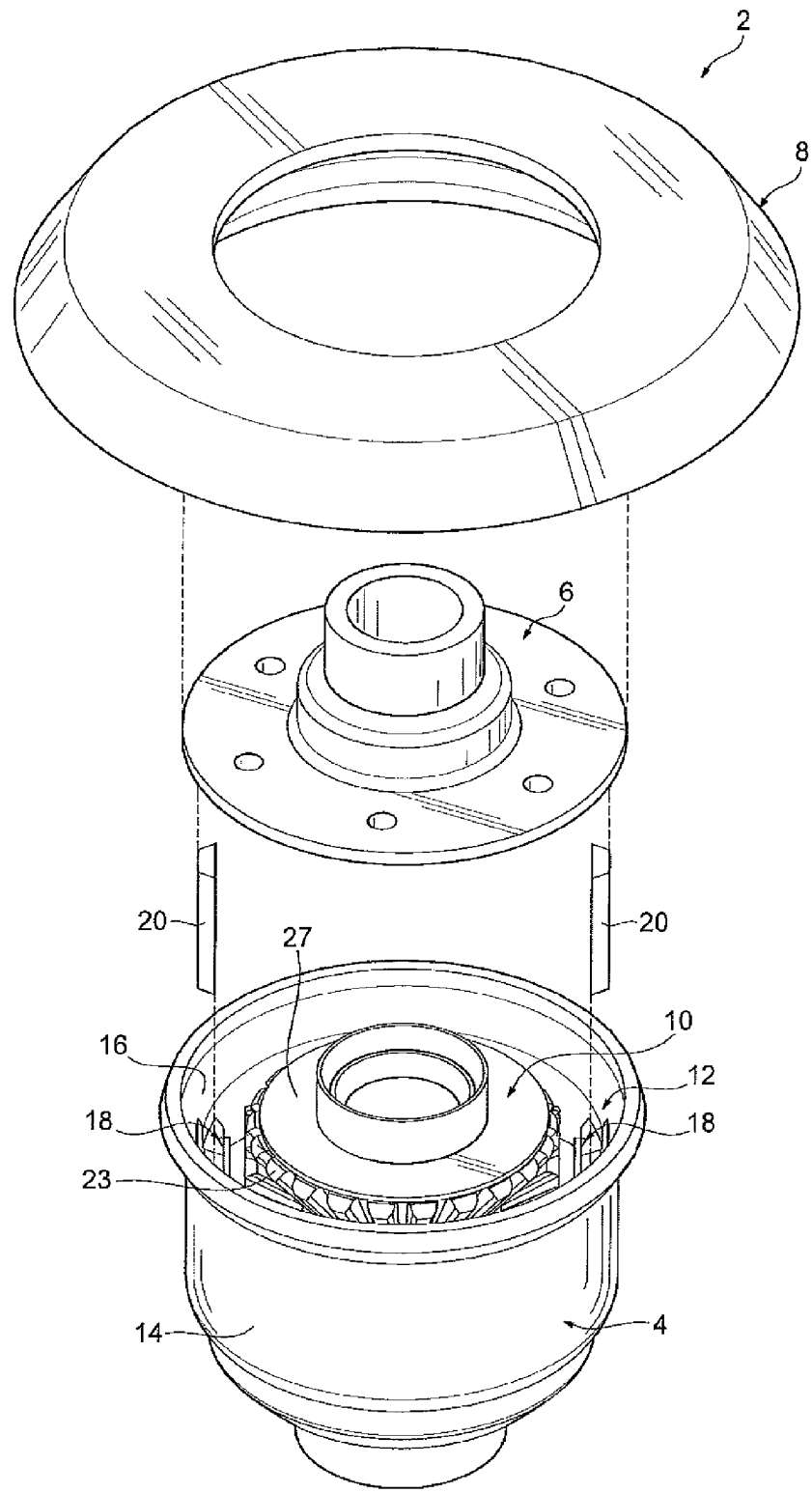
FIG. 3 is another partially exploded perspective view of the differential case assembly shown in FIG. 1.
Figure 4:
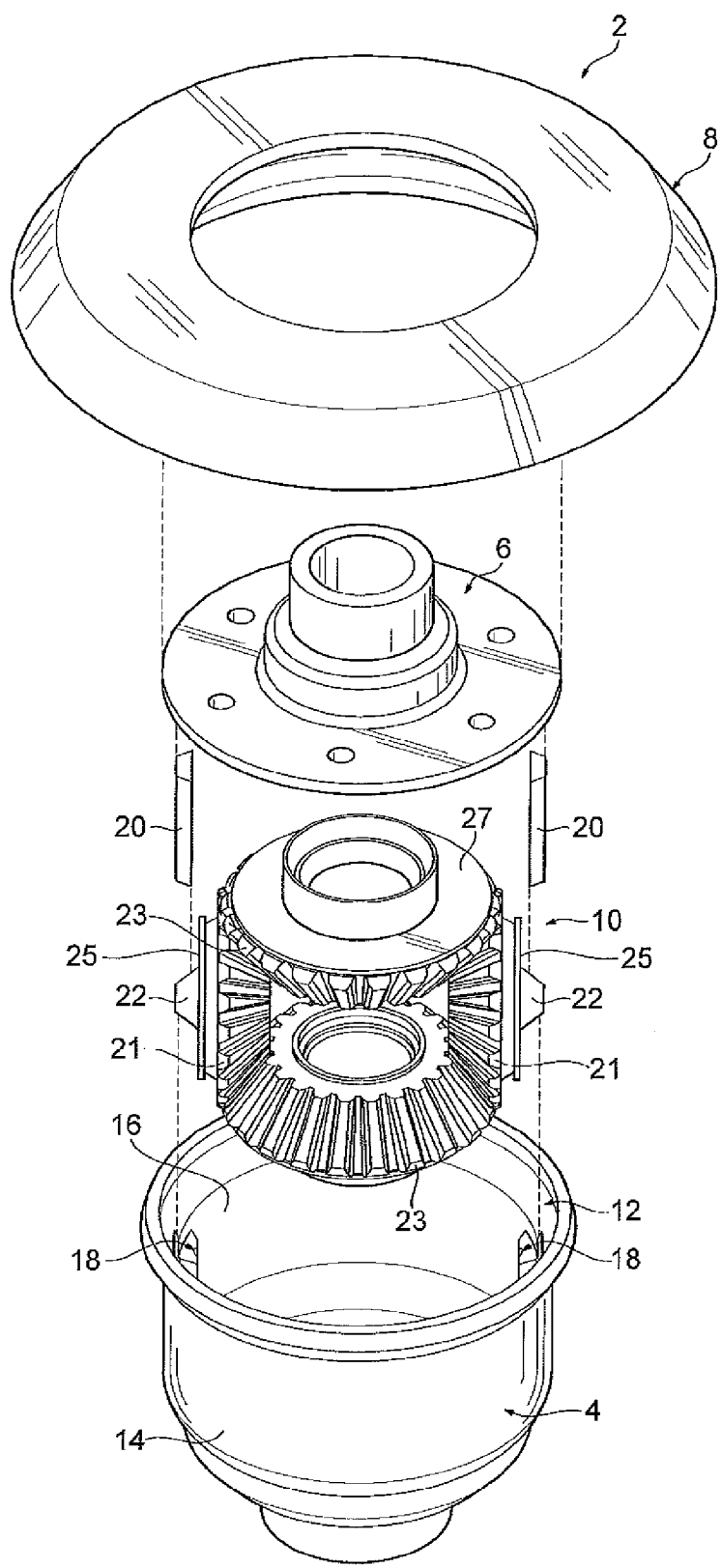
FIG. 4 is a further partially exploded perspective view of the differential case assembly shown in FIG. 1.
Figure 5:
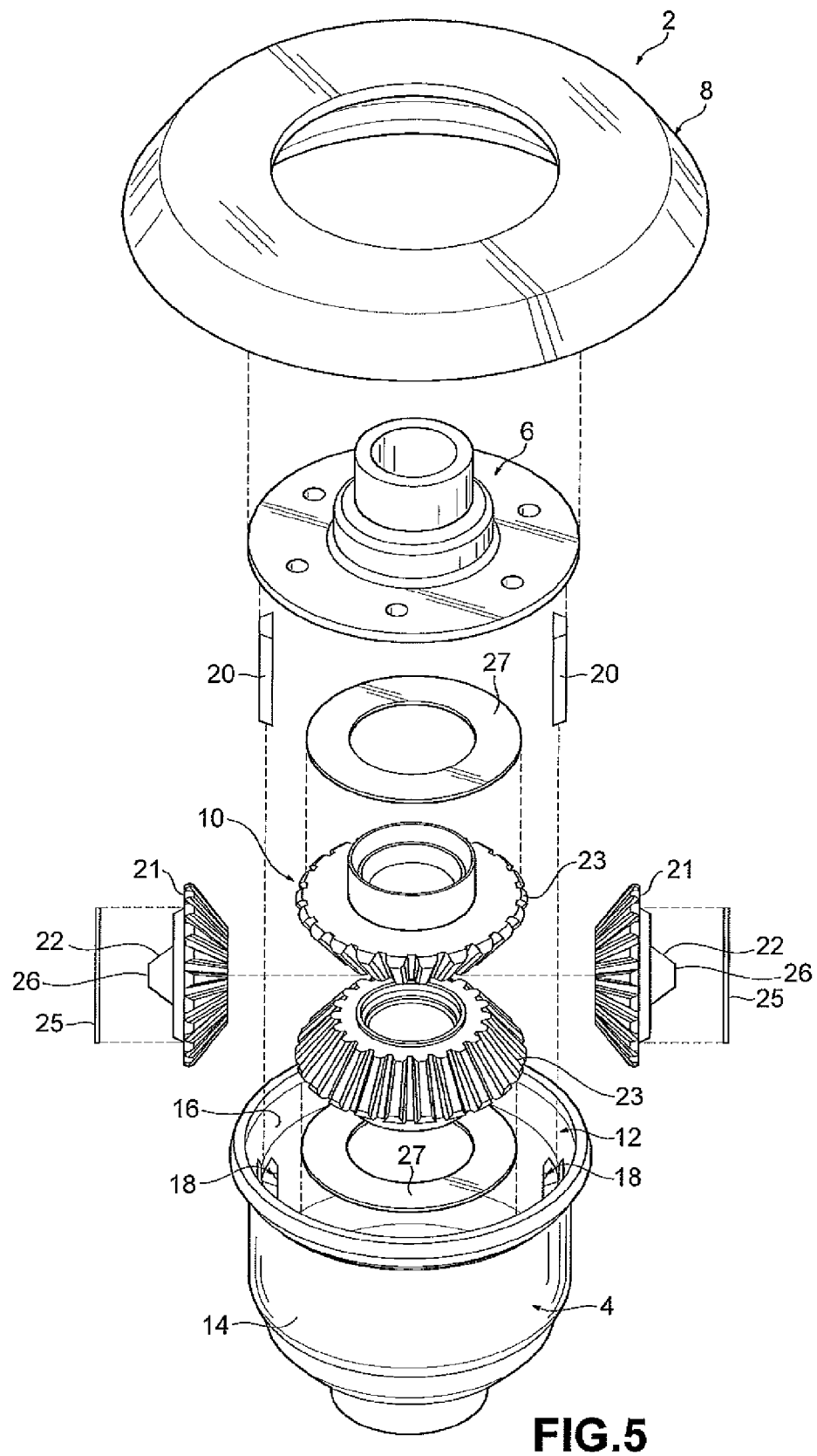
FIG. 5 is a fully exploded perspective view of the differential case assembly shown in FIG. 1.

As shown in FIGS. 3-5, the differential case 4 has an open end 12 and a side wall 14 with an interior surface 16. For example, the differential case 4 may be a flow formed shell as described further herein. A receptacle 18 is formed on the interior surface 16 of the side wall 14. The receptacle 18 may be a flow formed feature, as a nonlimiting example. Other means for forming the receptacle 18 may also be used. Any number of receptacles 18 may be employed, as desired. The end cap 6 and the ring gear 8 may be cold formed or hot formed, or formed by another suitable process, within the scope of the present disclosure.

The gear assembly 10 includes a pair of retainer inserts 20, for example, as illustrated in FIGS. 9-10, and at least one side gear 21 with an integral shaft 22. The integral shaft 22 extends outwardly from the side gear 21 toward the interior surface 16 of the differential case 4. The integral shaft 22 is short in comparison to known cross pins. In a particularly illustrative embodiment, a length of the shaft 22 is less than a thickness of the side gear 21 with which the shaft 22 is integrally formed. It should be appreciated that the elimination of cross pins minimizes a mass and size of the assembled differential case assembly 2. Other lengths for the integral shaft 22 may also used within the scope of the present disclosure.

Figure 6:
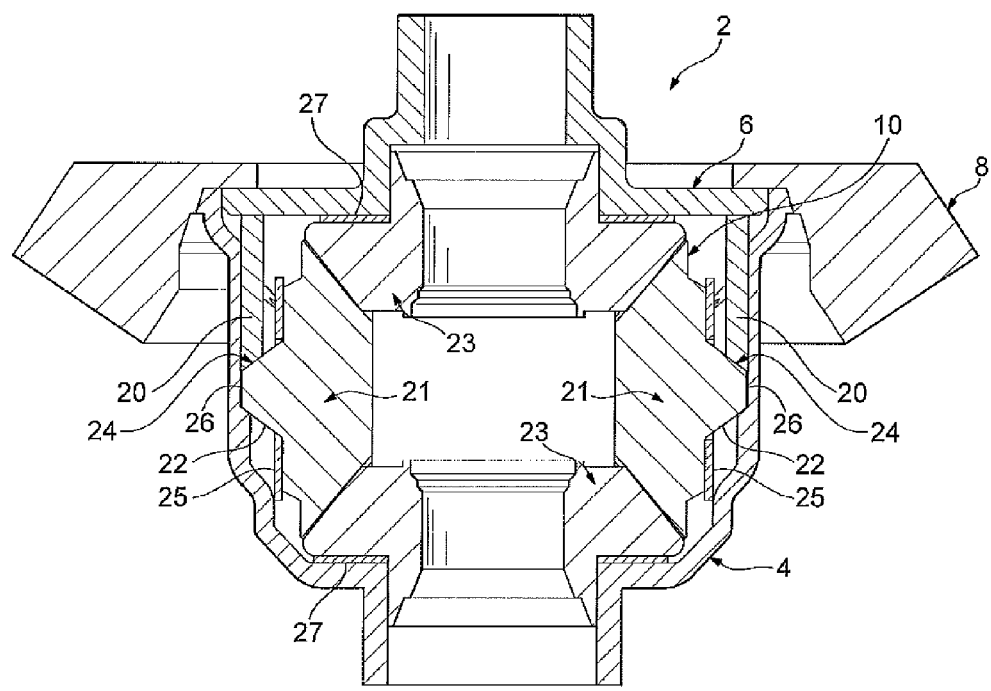
FIG. 6 is a cross-sectional side elevational view of the differential case assembly shown in FIG. 1.
Figure 7:
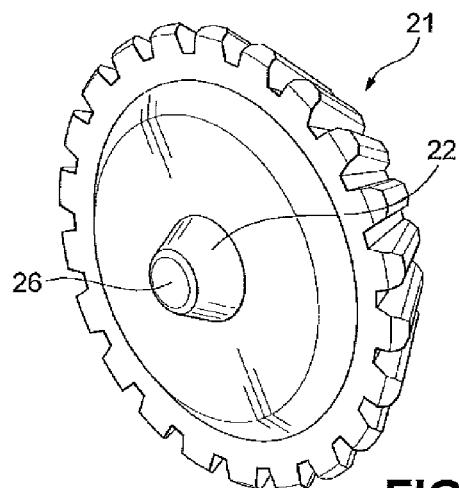
FIG. 7 is a perspective view of a side gear of the differential case assembly shown in FIGS. 1-6.
Figure 11:
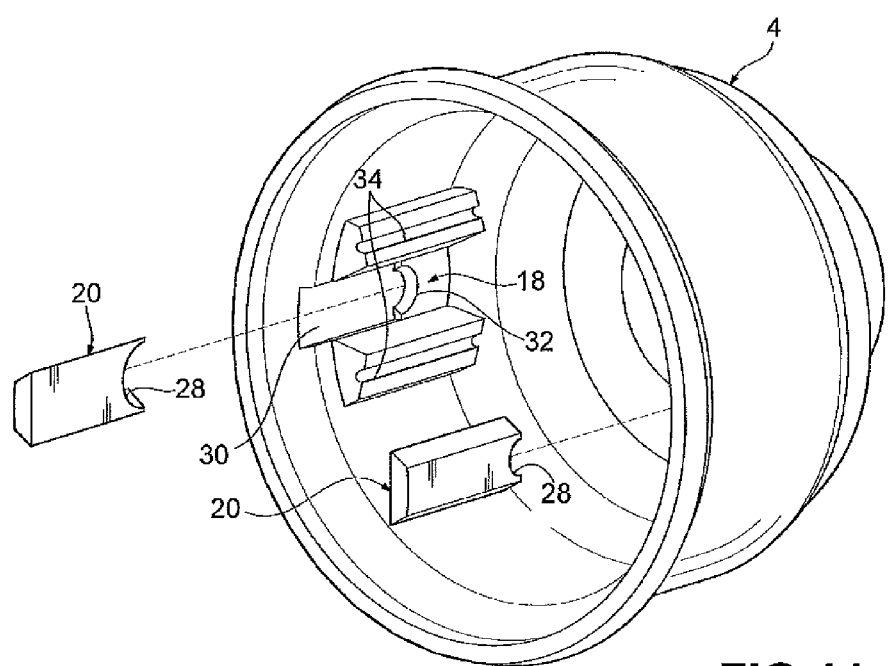
FIG. 11 is a partially exploded perspective view differential case assembly shown in FIG. 1, showing a cooperation of the retainer insert with a receptacle of a different case.

Each of the retainer inserts 20 is disposed adjacent the interior surface 16 of the side wall 14, for example, as illustrated FIGS. 6 and 11. The retainer inserts 20 may also be disposed adjacent the end cap 6. In particular embodiments, the retainer inserts 20 abut the end cap 6. As with the end cap 6 and the ring gear 8, the retainer insert 20 may be cold formed or hot formed. Other suitable methods for manufacturing the retainer inserts 20 may also be used, as desired.

Illustratively, the gear assembly 10 further includes at least one pinion gear 23. Although pairs of the side gears 21 are depicted in FIGS. 1-5, it should be appreciated that one side gear 21 may be used within the scope of the present disclosure. The gear assembly 10 may further include a washer 25 disposed over the shaft 22 of the side gear 21. Other washers 27 may also be employed with each of the pinion gears 23, as desired.

It should be appreciated that the retainer inserts 20 of the present disclosure cooperate with the receptacles 18 to accurately locate the side gears 21 and the pinion gears 23 within the differential case 4. In particular, the retainer inserts 20 locate the side gears 21 axially, since the retainer inserts 20 are secured on one end thereof by the interior surface 16 of the differential case 4 and an other end thereof by the end cap 6. The retainer inserts 20 also locate the side gears 21 circumferentially within the differential case 4, particularly because the retainer inserts 20 are constrained by the receptacles 18, which militate against a circumferential movement of the retainer inserts 20. The retainer inserts 20 also transfer a load from the shaft 22 along an entire length of each of the receptacles 18, within which the retainer inserts 20 are disposed.

As illustrated in FIGS. 1-5, the end cap 6 is disposed in the open end 12 of the differential case 4. In certain embodiments, the end cap 6 is welded to the differential case 4 to seal the open end 12 of the differential case 4. In a particular embodiment, the end cap 6 is press fit within the open end 12 of the differential case 4. The ring gear 8 is joined to the differential case 4 and the end cap 6 to hold the differential case assembly 2 together. As one example, the ring gear 8 may have a lip that axially retains the end cap 6 in the differential case 4. In a particular example, the ring gear 8 may hold the different case assembly 2 together, for example, as further described in Assignee's co-pending U.S. patent application Ser. No. 13/094,406, the entire disclosure of which is hereby incorporated herein by reference.

For purpose of locating the gear assembly 10 within the differential case 4, the integral shaft 22 of the present disclosure has an end 26 that is received in an aperture 24 of the differential case assembly 2. The aperture 24 is defined, at least in part, by the retainer inserts 20. For example, as shown in FIGS. 9-10, each of the retainer inserts 20 may include a surface 28 that corresponds with a shape of the shaft 22. As nonlimiting examples, the surface 28 may correspond with one of a tapered surface of the shaft 22, where the shaft 22 is frustoconical (shown in FIG. 7), and a cylindrical surface of the shaft 22, where the shaft 22 is cylindrical (shown in FIG. 14). The integral shaft 22 of the present disclosure may have other suitable shapes, as desired.

The receptacle 18 may include a recess 30 for receiving one of the retainer inserts 20. In particular embodiments, the recess 30 is a slot or groove flow formed in the interior surface 16 of the differential case 4. The recess 30 may have a receiving surface 32 that corresponds with a shape of the shaft 22. For example, the receiving surface 32 may be angled to corresponds with the shaft 22 where frustoconical, and arcuate to correspond with the shaft 22 where cylindrical.

In particular embodiments, the recess 30 may be formed between a pair of support rails 34. The support rails 34 may be disposed on opposing sides of the recess 30, for example. The surface 28 of the retainer inserts 20 cooperates with the receiving surface 32 of the receptacle 18 to define the aperture 24, and receive the end 26 of the integral shaft 22. The receptacles 18 and the retainer inserts 20 thereby locate and align the gear assembly 10 within the differential case 4.

Figure 12:
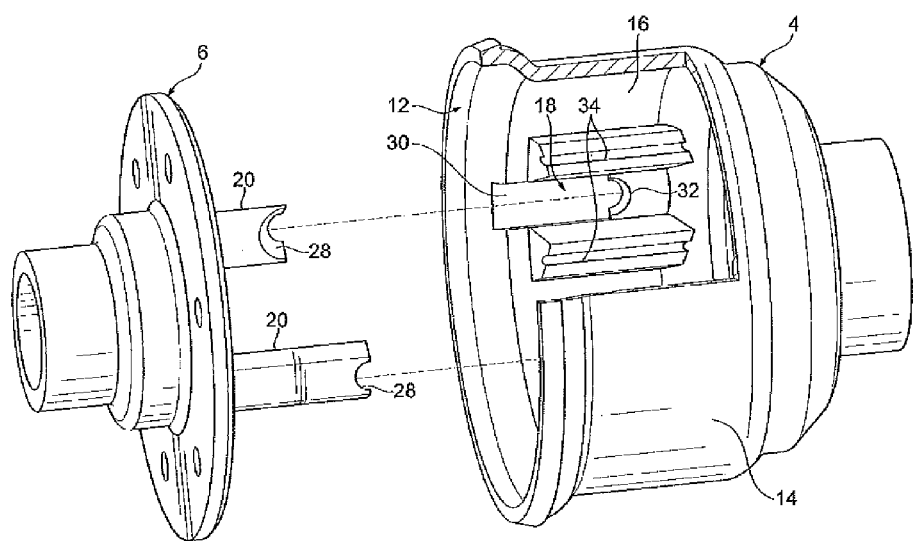
FIG. 12 is a partially exploded, fragmentary, perspective view of a differential case assembly according to another embodiment of the disclosure, showing the retainer insert being integral with a end cap of the differential case assembly.
Figure 13:
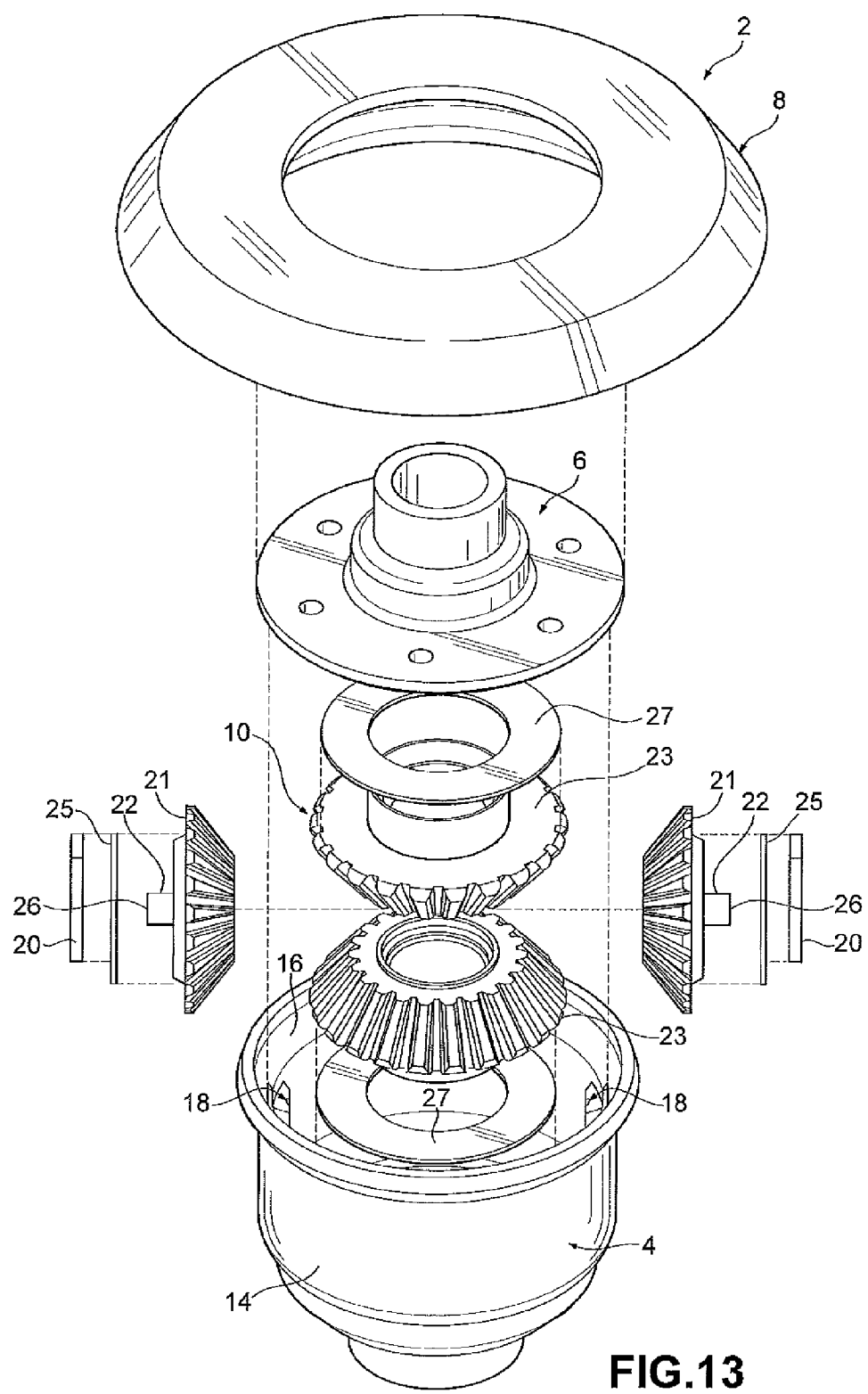
FIG. 13 is a fully exploded perspective view of a differential case assembly according to a further embodiment of the present disclosure.

With reference to FIG. 12, an alternative embodiment of the present disclosure is shown where the retainer inserts 20 are integral with the end cap 6. Where the retainer inserts 20 are integral with the end cap 6, the end cap 6 may be inserted into the opening 12 of the differential case 4 in order to slide the retainer inserts 20 adjacent the interior surface 16. The disposition of the retainer inserts 20 adjacent the interior surface 16, and in cooperation with the receptacle 18, thereby forms the aperture 24. Although only a pair of integral retainer inserts 20 are shown in FIG. 12, it should be understood that fewer or more retainer inserts 20 may be formed integrally with the end cap 6, as desired.

Figure 14:
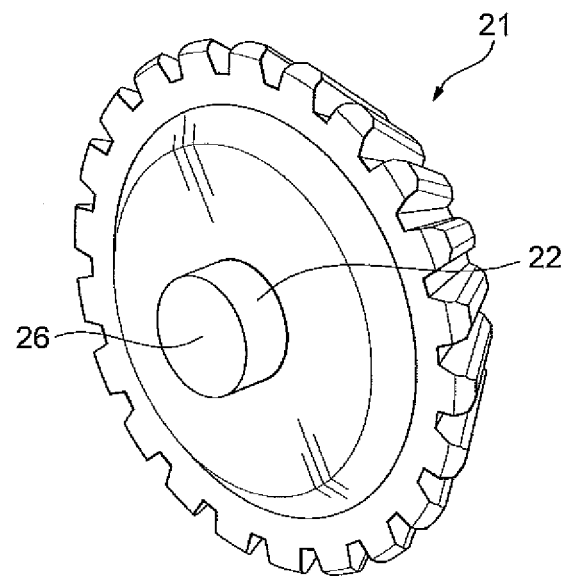
FIG. 14 is a perspective view of a side gear of the differential case assembly shown in FIG. 13.
Figure 15:
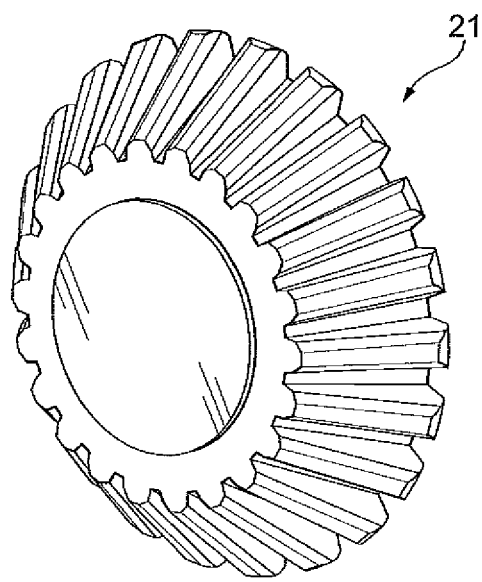
FIG. 15 is another perspective view of the side gear shown in FIG. 14.
Figure 16:
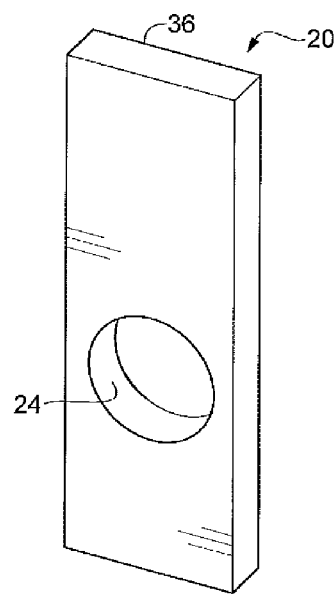
FIG. 16 is a perspective view of a retainer insert of the differential case assembly shown in FIG. 13, having a planar front surface and a planar rear surface.
Figure 17:
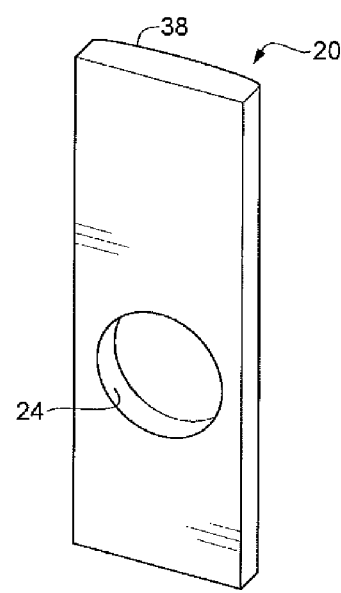
FIG. 17 is another perspective view of the retainer insert shown in FIG. 16, having a planar front surface and an arcuate rear surface.
Figure 18:
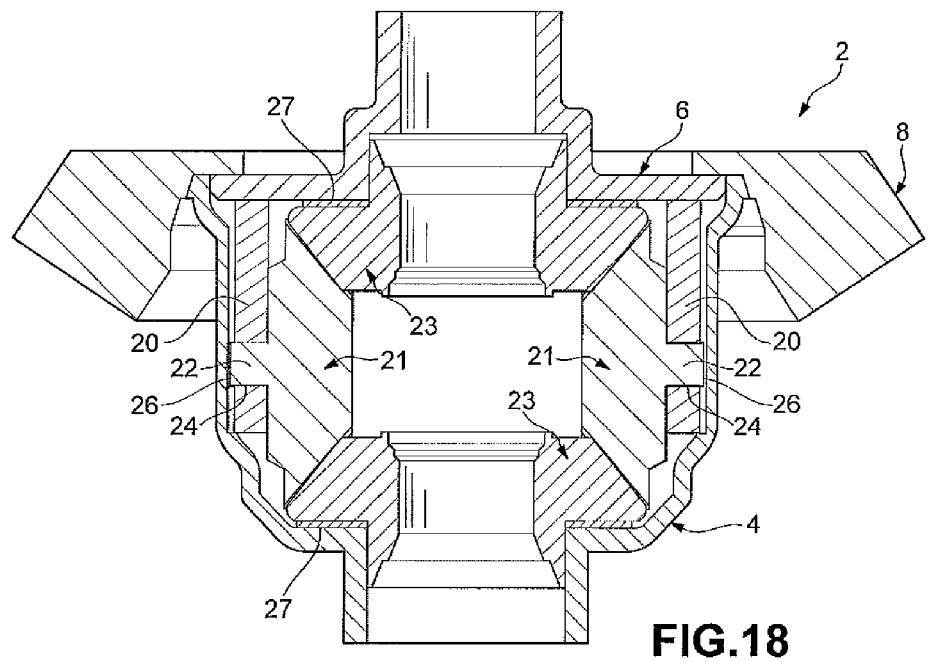
FIG. 18 is a cross-sectional side elevational view of the differential case assembly shown in FIG. 13.

A further embodiment of the present disclosure is depicted in FIGS. 13-19. In the further embodiment, the integral shaft 22 of the side gear 21 may be cylindrical in shape, as shown in FIG. 14, and cooperate with the retainer inserts 20. Where the integral shaft 22 of the side gear 21 is cylindrical, the retainer inserts 20 may define an entirety of the apertures 24, for example, as shown in FIGS. 16 and 17. Like other embodiments described hereinabove, the retainer inserts 20 are disposed adjacent the interior surface 16 of the differential case 4 and, particularly, adjacent the receptacle 18. The retainer inserts 20 defining the entirety of the apertures 24 are likewise secured and constrained both axially and circumferentially within the differential case assembly 2.

Figure 19:
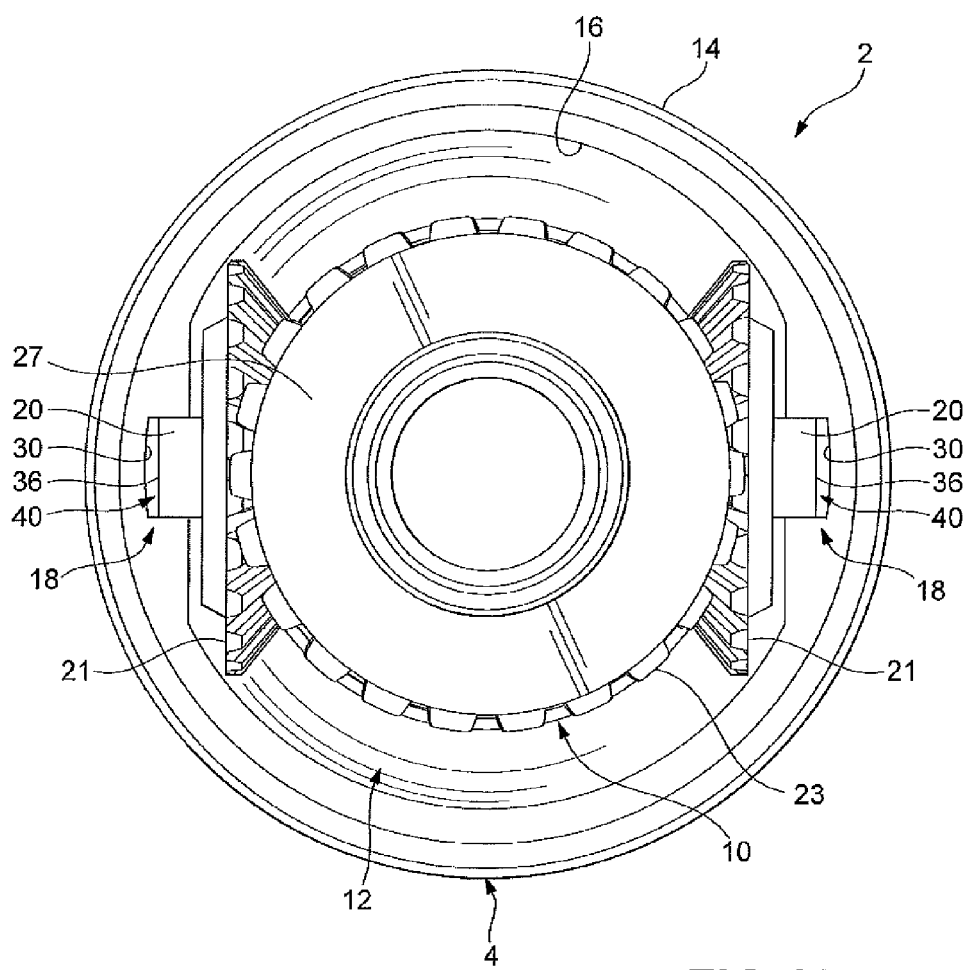
FIG. 19 is an end plan view of the differential case assembly shown in FIG. 13, depicted without an end cap and a ring gear.

In certain examples, the retainer inserts 20 may have one of a planar rear surface 36 (shown in FIG. 16) and an arcuate rear surface 38 (shown in FIG. 17), for example. Where the planar rear surface 36 is employed, a gap 40 may exist between the planar rear surface 36 and the recess 30 of the receptacle 18, for example, as illustrated in FIG. 19. Where the retainer inserts 20 have the arcuate rear surface 38, the arcuate rear surface 38 may correspond substantially with a shape of the recess 30, and thereby minimize or eliminate the gap 40. Other shapes for the receptacles 18 and the retainer inserts 20 may also be used within the scope of the present disclosure.

Skilled artisans should appreciate that the flow forming process for manufacturing the differential case 4 results in a plastic deformation of the preform and a non-interrupted grain flow for the formed difference case 4. Through plastic deformation, the preform material undergoes work hardening and can become stronger than the original preform material.

The flow formed difference case 4 furthermore has minimal porosity and can be made thinner by wall reduction, and significantly lighter in comparison to cast iron differential case assemblies known in the art. One of ordinary skill in the art also understands that a clutch pack may be readily incorporated by means of a modified flow form mandrel with the differential case assembly 2 described hereinabove.

Advantageously, the differential case assembly 2 of the present disclosure is less massive, due at least in part to the absence of a cross pin, and more volumetrically efficient than differentials for motorized vehicles that are known in the art.

While certain representative embodiments and details have been shown for purposes of illustrating the invention, it will be apparent to those skilled in the art that various changes may be made without departing from the scope of the disclosure, which is further described in the following appended claims.

What is claimed is:

1. A differential case assembly, comprising:
   a differential case having an open end and a side wall with an interior surface;
   a pinless gear assembly including a retainer insert and a side gear with an integral cylindrical shaft extending outwardly therefrom, the retainer insert disposed adjacent the interior surface of the side wall, the retainer insert defining at least a portion of an aperture, and an end of the cylindrical shaft received in the aperture to align the gear assembly within the differential case; and
   a receptacle formed on the interior surface of the side wall, the receptacle including a recess for receiving the retainer insert.

2. The differential case assembly of claim 1, wherein the differential case is flow formed.

3. The differential case assembly of claim 1, further comprising an end cap disposed in the open end of the differential case.

4. The differential case assembly of claim 3, wherein the retainer insert is disposed adjacent the end cap.

5. The differential case assembly of claim 3, wherein the retainer insert is integral with the end cap.

6. The differential case assembly of claim 3, further comprising a ring gear having a lip that axially retains the end cap in the differential case.

7. The differential case assembly of claim 1, wherein the aperture is entirely defined by the retainer insert.

8. The differential case assembly of claim 1, wherein the retainer insert has an arcuate rear surface disposed adjacent the interior surface of the side wall.

9. The differential case assembly of claim 8, wherein a gap is defined between the interior surface of the side wall and the arcuate rear surface of the retainer insert.

10. The differential case assembly of claim 1, further comprising a washer disposed between the side gear and the interior surface of the differential case, the shaft of the side gear disposed through the washer.

11. The differential case assembly of claim 1, wherein the pinless gear assembly further includes an other side gear disposed opposite the side gear in the differential case.

12. The differential case assembly of claim 1, wherein a length of the shaft is less than a thickness of the side gear.

13. The differential case assembly of claim 1, wherein the pinless gear assembly further comprises a pinion gear that cooperates with the side gear.

14. The differential case assembly of claim 1, wherein the differential case is flow formed and the receptacle is a flow formed feature.

15. The differential case assembly of claim 1, wherein the recess is one of a slot and a groove flow formed in the interior surface of the differential case.

16. The differential case assembly of claim 1, wherein the recess has a receiving surface that corresponds with a shape of the cylindrical shaft.

17. A differential case assembly, comprising:
    a differential case having an open end and a side wall with an interior surface;
    a pinless gear assembly including a retainer insert and a side gear with an integral cylindrical shaft extending outwardly therefrom, the retainer insert disposed adjacent the interior surface of the side wall, the retainer insert defining at least a portion of an aperture, and an end of the cylindrical shaft received in the aperture to align the gear assembly within the differential case; and
    an end cap disposed in the open end of the differential case, the retainer insert integral with the end cap.

18. A differential case assembly, comprising:
    a differential case having an open end and a side wall with an interior surface;
    a pinless gear assembly including a retainer insert and a side gear with an integral cylindrical shaft extending outwardly therefrom, the retainer insert disposed adjacent the interior surface of the side wall, the retainer insert defining at least a portion of an aperture, and an end of the cylindrical shaft received in the aperture to align the gear assembly within the differential case;
    an end cap disposed in the open end of the differential case, the retainer insert integral with the end cap; and
    a ring gear having a lip that axially retains the end cap in the differential case.

* * * * *